US005486957A

United States Patent [19]
Albrecht

[11] Patent Number: 5,486,957
[45] Date of Patent: Jan. 23, 1996

[54] DISK DRIVE WITH RECTIFIER CIRCUIT FOR PARKING THE HEAD CARRIERS ON POWER DOWN

[75] Inventor: Thomas R. Albrecht, San Jose, Calif.

[73] Assignee: International Business Machines Corporation, Armonk, N.Y.

[21] Appl. No.: 252,304

[22] Filed: Jun. 1, 1994

[51] Int. Cl.⁶ .................................................. G11B 21/02
[52] U.S. Cl. .............................. 360/75; 360/105; 318/561
[58] Field of Search .................................. 360/75, 28.04, 360/105; 318/560, 561, 138, 254

[56] References Cited

U.S. PATENT DOCUMENTS

| 4,237,501 | 12/1980 | Barmache et al. | 360/75 |
| 4,831,469 | 5/1989 | Hanson et al. | 360/75 |
| 4,866,554 | 9/1989 | Stupeck et al. | 360/105 |
| 5,231,549 | 7/1993 | Morehouse et al. | 360/75 |

FOREIGN PATENT DOCUMENTS

| 0537916 | 9/1992 | European Pat. Off. | G11B 19/20 |
| 63-83980 | 4/1988 | Japan | G11B 21/12 |
| 63-149886 | 6/1988 | Japan | G11B 21/12 |
| 253271 | 2/1990 | Japan | G11B 21/12 |
| 2289968 | 11/1990 | Japan | G11B 19/00 |
| 3113881 | 5/1991 | Japan | G11B 21/12 |
| 3259479 | 11/1991 | Japan | G11B 21/12 |
| 434772 | 2/1992 | Japan | G11B 21/02 |
| 2121589 | 6/1986 | United Kingdom | G11B 21/02 |

OTHER PUBLICATIONS

G. D. Carpenter et al., "Delta Voltage Control During Actuator Retract", IBM Technical Disclosure Bulletin, vol. 35, No. 1B, Jun. 1992, pp. 337–339.

Primary Examiner—Aristotelis Psitos
Assistant Examiner—Varsha A. Kapadia
Attorney, Agent, or Firm—Thomas R. Berthold

[57] ABSTRACT

A magnetic recording disk drive has a rectifier circuit made up of bipolar transistors. Upon removal of power to the spindle motor, the rectifier circuit converts AC spindle motor output to DC actuator coil current to drive the actuator to a parking ramp where the read/write heads are "unloaded" from their respective disk surfaces. The transistor emitter-base junctions are connected to a switch, such as a pair of field-effect transistors, that is responsive to removal of power to the spindle motor. The total current flowing in these emitter-base junctions is small due to the use of series resistors and because the current in the emitter-base circuit does not flow through the actuator coil. The emitter-collector paths of the bipolar transistors are connected as a three-phase, full-wave rectifier to the actuator coil. When the transistors are turned on by the small amount of current from the spindle motor windings through the emitter-base junctions, the majority of current from the windings is allowed to flow through the emitter-collector paths of those transistors to the actuator coil.

10 Claims, 5 Drawing Sheets

DISK DRIVE WITH RECTIFIER CIRCUIT FOR PARKING THE HEAD CARRIERS ON POWER DOWN

TECHNICAL FIELD

This invention relates in general to data recording disk drives, and more particularly to a magnetic recording rigid disk drive that has a rectifier circuit for converting back electromotive force from the spindle motor to actuator coil current to drive the carrier to a parking location when the disk drive is powered down.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read or write operations. The actuator is a voice coil motor (VCM) comprising a coil movable through a magnetic field generated by a fixed permanent magnet assembly. There are typically a plurality of disks separated by spacer rings and stacked on a hub that is rotated by a disk drive motor, also called a spindle motor. A housing supports the spindle motor and head actuator, and surrounds the head and disk to provide a substantially sealed environment for the head-disk interface.

In conventional magnetic recording disk drives, the head carrier is an air-bearing slider that rides on a bearing of air above the disk surface when the disk is rotating at its operational speed. The slider is maintained next to the disk surface by a suspension that connects the slider to the actuator. The slider is either biased toward the disk surface by a small spring force from the suspension, or is "self-loaded" to the disk surface by means of a "negative-pressure" air-bearing surface on the slider.

Contact start/stop (CSS) disk drives operate with the slider in contact with the disk surface during start and stop operations when there is insufficient disk rotational speed to maintain the air bearing. To minimize the effect of "stiction", i.e., the static friction and adhesion forces between the very smooth disk surface and the slider, CSS disk drives often use a dedicated "landing zone" where the slider is parked when the drive is not operating. The landing zone is typically a specially textured nondata region of the disk.

In contrast to CSS disk drives, "load/unload" disk drives address the stiction problem by mechanically unloading the slider from the disk when the power is turned off, and then loading the slider back to the disk when the disk has reached a speed sufficient to generate the air bearing. The loading and unloading is typically done by means of a ramp that contacts the suspension when the actuator is moved away from the data region of the disk. The slider is thus parked off the disk surface with the suspension supported in a recess of the ramp. Load/unload disk drives are commonly used in laptop and notebook computers because the parking of the slider on the ramp away from the disk surface also provides some resistance to external shocks caused by moving or dropping the computer.

In contrast to conventional air-bearing disk drives, contact or near-contact disk drives have been proposed that place the head carrier in constant or occasional contact with the disk or a liquid film on the disk during read and write operations. Examples of these types of disk drives are described in IBM's U.S. Pat. No. 5,202,803 and published European application EP 367510; U.S. Pat. No. 5,097,368, assigned to Conner Peripherals; and U.S. Pat. No. 5,041,932, assigned to Censtor Corporation.

The parking of the head carrier during disk drive power down is typically accomplished by use of file back electromotive force (EMF) generated by the freely rotating spindle motor. When the disk drive supply voltage is removed, the VCM is disconnected from its driver circuitry and connected to a rectifier circuit that is coupled to the spindle motor. The output of the freely rotating spindle motor is converted by the rectifier circuit to a DC current supplied to the coil of the VCM. This causes the actuator to move the head carrier to its parked location. For CSS disk drives, only a relatively small amount of actuator torque is needed to bring the head carrier to the landing zone so that relatively inefficient rectifier circuits are sufficient to apply the necessary current to the VCM. A single-phase, half-wave rectifier circuit using a conventional single silicon diode is commonly used for this purpose. However, for load/unload disk drives, significantly more torque is needed to ensure that the head carrier is fully parked on the ramp, regardless of the actuator position or velocity at power down. The most difficult situation is when the actuator is at rest with the head carrier located near the disk outside diameter immediately adjacent to the ramp. Then there is no time for the actuator to build up momentum so maximum torque is needed immediately. A three-phase, full-wave rectifier circuit with Schottky barrier diodes is commonly used for this purpose. Because there are always two diodes in series with the VCM load, the total voltage drop in this rectifier circuit can be relatively high, thus reducing the DC current available to the VCM. The diodes can be replaced with field-effect transistors (FETs) to reduce the voltage drop, but such devices need to be switched on and off synchronously with each phase of the spindle motor. This requires additional sensing and control circuitry which needs its own DC power source, e.g., a storage capacitor, because the back EMF is insufficient to also power this circuitry.

What is needed for both CSS and load/unload disk drives is a simple, low-cost, power-efficient rectifier circuit for supplying DC current to the VCM to park the head carrier at disk drive power down.

SUMMARY OF THE INVENTION

The present invention is a disk drive with a simple, low-cost, efficient bipolar transistor rectifier circuit, activated by the removal of power from the drive, that uses the back EMF generated by the angular momentum of the spinning spindle and disks to move the actuator to a desired position when power is removed. The transistors that have their emitter-base junctions connected to a switch are responsive to removal of power to the disk drive. A small amount of current derived from the motor back EMF automatically switches the appropriate transistors on to serve as a full-wave, three-phase rectifier with low voltage drop. The total current flowing in the emitter-base junctions is small due to the use of series resistors and because the current in the emitter-base circuit does not flow through the coil of the VCM. The emitter-collector paths of the bipolar transistors are connected as a three-phase, full-wave rectifier to the coil of the VCM. When the transistors are turned on by the small amount of current from the spindle motor windings through the emitter-base junctions, the majority of current from the windings is allowed to flow through the emitter-collector paths of those transistors to the coil of the VCM. Although the entire back EMF is used to derive switching signals (transistor base current), only a small fraction of a volt is lost as voltage drop in the rectifier circuit.

For a fuller understanding of the nature and advantages of the present invention, reference should be made to the following detailed description taken together with the accompanying drawings.

DETAILED DESCRIPTION PRIOR ART

Figure 1:
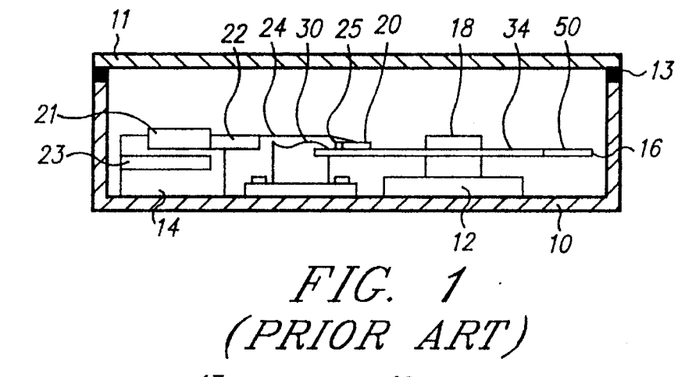
FIG. 1 is a sectional schematic view of a conventional disk drive.
Figure 2:
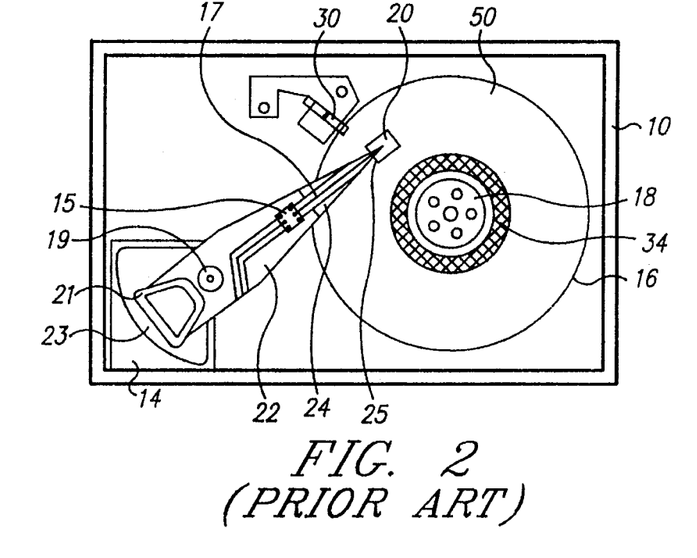
FIG. 2 is an open top view of the disk drive depicted schematically in FIG. 1 and shows the alternative head parking schemes used in conventional disk drives, i.e., a head landing zone on the disk and a head load/unload ramp.

Referring first to FIG. 1, there is illustrated in sectional view a schematic of a conventional disk drive. For ease of illustration and explanation, the disk drive depicted in FIGS. 1 and 2 is shown as having a single recording head and associated disk surface, although conventional disk drives typically have multiple heads and disks. The disk drive comprises a base 10 to which are secured a disk drive or spindle motor 12 and an actuator 14, and a cover 11. The base 10 and cover 11 provide a substantially sealed housing for the disk drive. Typically, there is a gasket 13 located between base 10 and cover 11, and a small breather port (not shown) for equalizing pressure between the interior of the disk drive and the outside environment. A magnetic recording disk 16 is connected to spindle motor 12 by means of a spindle or hub 18. A thin film 50 of lubricant is maintained on the surface of disk 16. The lubricant may be a conventional perfluoro-polyether (PFPE) disk lubricant, such as Z-DOL brand from Montedison. A read/write head or transducer 25 is formed on the trailing end of an air-beating slider 20. Transducer 25 may be an inductive read and write transducer or an inductive write transducer with a magnetoresistive (MR) read transducer formed by thin-film deposition techniques as is known in the art. The slider 20 is connected to the actuator 14 by means of a rigid arm 22 and a suspension 24, the suspension 24 providing a biasing force that urges the slider 20 onto the surface of the recording disk 16. The arm 22, suspension 24, and slider 20 with transducer 25 are referred to as the head-arm assembly. During operation of the disk drive, the spindle motor 12 rotates the disk 16 at a constant speed, and the actuator 14 pivots on shaft 19 to move the slider 20 generally radially across the surface of the disk 16 so that the read/write transduce 25 may access different data tracks on disk 16. The actuator 14 is a rotary voice coil motor (VCM) having a coil 21 that moves through the fixed magnetic field of magnet assembly 23 when current is applied to the coil.

FIG. 2 is a top view of the interior of the disk drive with the cover 11 removed, and illustrates in better detail the suspension 24 that provides a force to the slider 20 to urge it toward the disk 16. The suspension may be a conventional type of suspension such as the well-known Watrous suspension, as described in U.S. Pat. No. 4,167,765, assigned to IBM. This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via flex cable 17 to chip 15, which sends its output signals via cable 19.

In the load/unload embodiment of the disk drive, a load/unload ramp 30 is mounted to the base 10. Ramp 30 contacts suspension 24 and lifts the slider 20 away from the disk 16 when the actuator 14 rotates the slider 20 toward the disk outside diameter when the disk drive is powered down. Examples of conventional types of load/unload ramps are described in U.S. Pat. Nos. 3,984,873, assigned to Information Storage Systems, Inc. (see and 5,027,241, assigned to Quantum Corporation. In the CSS embodiment of the disk drive the disk has a dedicated textured landing zone 34 near the disk inside diameter away from the data region.

In general, the preferred parking location for the actuator 14 when the disk drive is stopped will be its usual storage location, i.e., either with the slider 20 unloaded off the disk 16 by the ramp 30 (for a load/unload drive) or with the slider 20 in contact with the textured surface of the disk 16 at the landing zone 34 (for a CSS drive).

Figure 3:
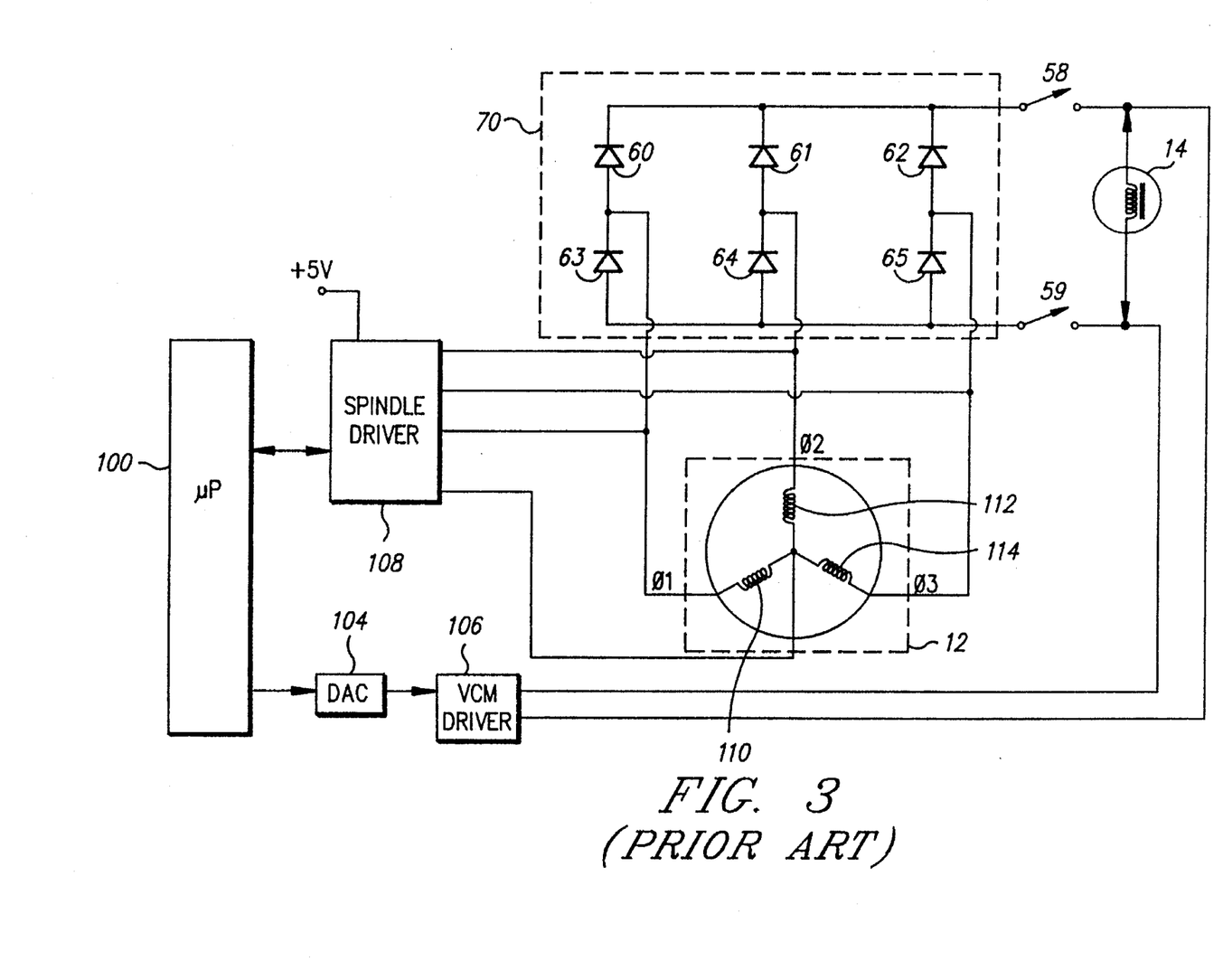
FIG. 3 is a block diagram of a disk drive showing a prior art diode-type rectifier circuit for converting spindle motor back EMF to VCM current for parking the head carrier at power down.

Referring now to FIG. 3, the drive includes a microprocessor 100 that controls the VCM 14 and the spindle motor 12. During read and write operations, the microprocessor 100 receives head position servo information from disk 16 and generates digital output to a digital-to-analog converter (DAC) 104. DAC 104 is coupled to a VCM driver 106 that sends current pulses to the coil of VCM 14 to move the head 25 (FIG. 2) on slider 20 to the appropriate data track on disk 16 during track "seeking" and to maintain the head 25 on track during track "following". Microprocessor 100 also controls and is connected to the spindle motor 12 via spindle driver 108. The spindle driver 108 controls the current from the power supply (e.g., a 5V battery source in the case of notebook and laptop computers) to the windings of spindle motor 12 to rotate the motor at a constant rotational speed during drive operation. In addition, the spindle driver 108 provides a status signal to microprocessor 100 indicating whether or not the spindle motor 12 is rotating at its operating speed. The spindle motor 12 may be a "delta" or "Y" (as shown in FIG. 3) type brushless, three-phase motor with fixed windings 110, 112, 114 as field coils and a permanent magnet rotor.

FIG. 3 also illustrates the prior art rectifier circuit 70 for energizing the VCM 14 at disk drive power down with the back EMF from spindle motor 12 windings 110, 112, 114. The design of the VCM driver 106 and spindle driver 108 is such that when power is removed, theft respective output lines to the VCM 14 and spindle motor 12 behave as open circuits (disconnected). When power is removed, appropriate circuitry closes switches 58 and 59, which may be relays, solid state switches such as FETs, or other switching devices. The VCM 14 and spindle motor 12 are then effectively disconnected from the VCM driver 106 and spindle driver 108, and connected to rectifier circuit 70. The rectifier circuit 70 includes diodes 60-65 which form a conventional three-phase, full-wave rectifier. When power is removed, the spindle motor 12 (and the disk stack mounted on it) continue spinning due to rotational inertia. Back EMF in the spindle motor 12 results in the generation of AC currents in the motor windings 110, 112, 114. The spindle motor 12 essentially behaves as a three-phase AC generator, and the resulting output current is rectified by the rectifier circuit 70. The output of the rectifier circuit 70 is a DC current that flows through the now closed switches 58 and 59 to the VCM 14, causing the VCM 14 to move slider 20 (FIG. 2) to the desired power-off parked position, such as ramp 30.

In conventional drives, only a small amount of current is needed to bring the VCM 14 to its parked position, usually in landing zone 34 (FIG. 2) near the inside diameter of disk 16. For drives with ramp load/unload, however, the VCM 14 must move the slider 20 so it is supported in ramp 30 for parking. This requires considerably more torque and thus current to the VCM 14. The conventional rectifier circuit 70 shown in FIG. 3 may not offer sufficient current for reliable parking in load/unload disk drives. This is because in rectifier circuit 70, current must always pass through at least two of the diodes 60–65 in series with the VCM 14 at all times. This can be understood by considering as an example the instant when the current output from winding 110 is more positive than the current output from winding 112 and winding 114 has no output. Then current would flow in series through winding 110, diode 60, VCM 14, diode 64, and winding 112. Conventional diodes suitable for the rectifier circuit 70 have voltage drops in the range of 0.4–0.8 volts, resulting in a total voltage drop of 0.8–1.6 volts. Small disk drives, such as those used in notebook and laptop computers, operate from single 5-volt (or less) power supplies and have spindle back EMF voltages on the order of 1–3 volts. Thus, a drop of 0.8–1.6 volts in the rectifier circuit 70 results in a loss of a significant fraction of the current and force otherwise available to VCM 14.

Figure 4:
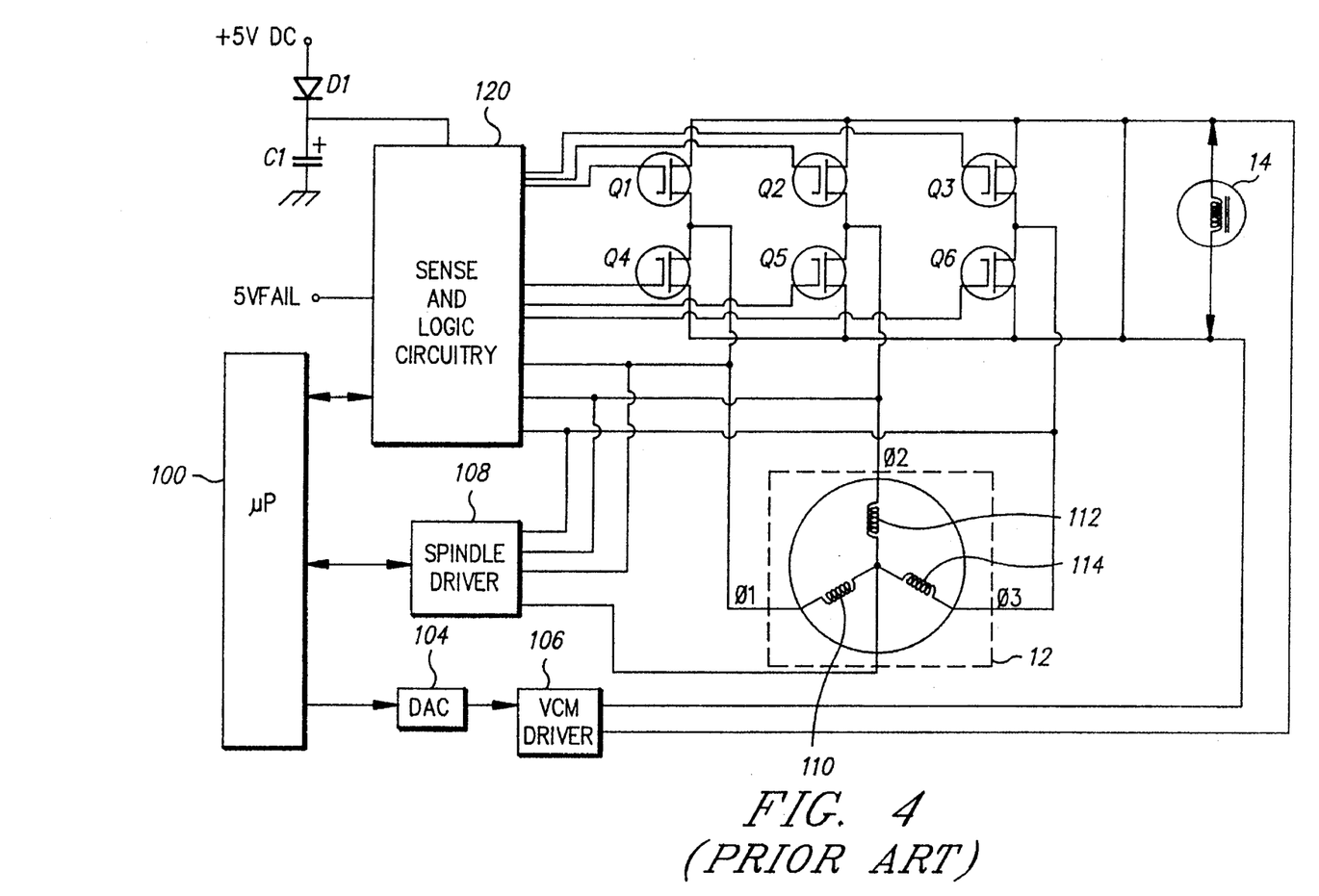
FIG. 4 is a block diagram of a disk drive showing a prior art FET-type rectifier circuit with sense and logic circuitry.

Another prior art power-off actuator retract system is shown in FIG. 4. While the prior art system of FIG. 3 is relatively simple but has a high voltage drop, the system shown in FIG. 4 provides a lower voltage drop but is more complicated and expensive. The circuitry shown in FIG. 4 is typically provided along with many other servo related functions on a single chip. In FIG. 4, FETs Q1–Q6 replace the diodes of FIG. 3 to form the three-phase, full-wave rectifier delivering DC current to the VCM 14 at drive power down. The sense and logic circuitry 120 continuously measures the voltages on the motor windings 110, 112, 114, and turns Q1–Q6 on and off individually at the optimum moments for best efficiency of the rectifier. The FETs Q1–Q6 may have "on" resistances of less than 1 ohm, yielding total voltage drops in the circuit of less than 0.2 volts for currents typically encountered. The sense and logic circuitry 120 is comprised of several comparators, decision-making logic, and FET drivers, all of which require external power to operate. Thus, the system shown in FIG. 4 requires that sense and logic circuitry 120 operate off energy stored in capacitor C1 after power has been removed. All of the components except capacitor C1 may be incorporated into a single chip design.

PREFERRED EMBODIMENT

The invention is a disk drive having a rectifier circuit that reduces the voltage drop to 0.3–0.5 volts through the use of bipolar transistors instead of diodes, but without the need for complex and costly sense and logic circuitry and its required separate power source. The configuration in which the bipolar transistors are connected operates with typical spindle back EMF voltages of 1.2 volts or greater to provide a much larger current to VCM 14 than that provided by the conventional circuit shown in FIG. 3. However, the invention is not the mere substitution of bipolar transistors for diodes. Instead, the VCM and the emitter-collector junctions of the bipolar transistors are arranged in parallel with the switch and the emitter-base junctions of the bipolar transistors. As a result, the full back EMF from the spindle motor is available to turn on the transistors, while the voltage drop across the emitter-collector junctions in the VCM circuit path is relatively small. This will be explained with reference to FIG. 5.

Figure 5:
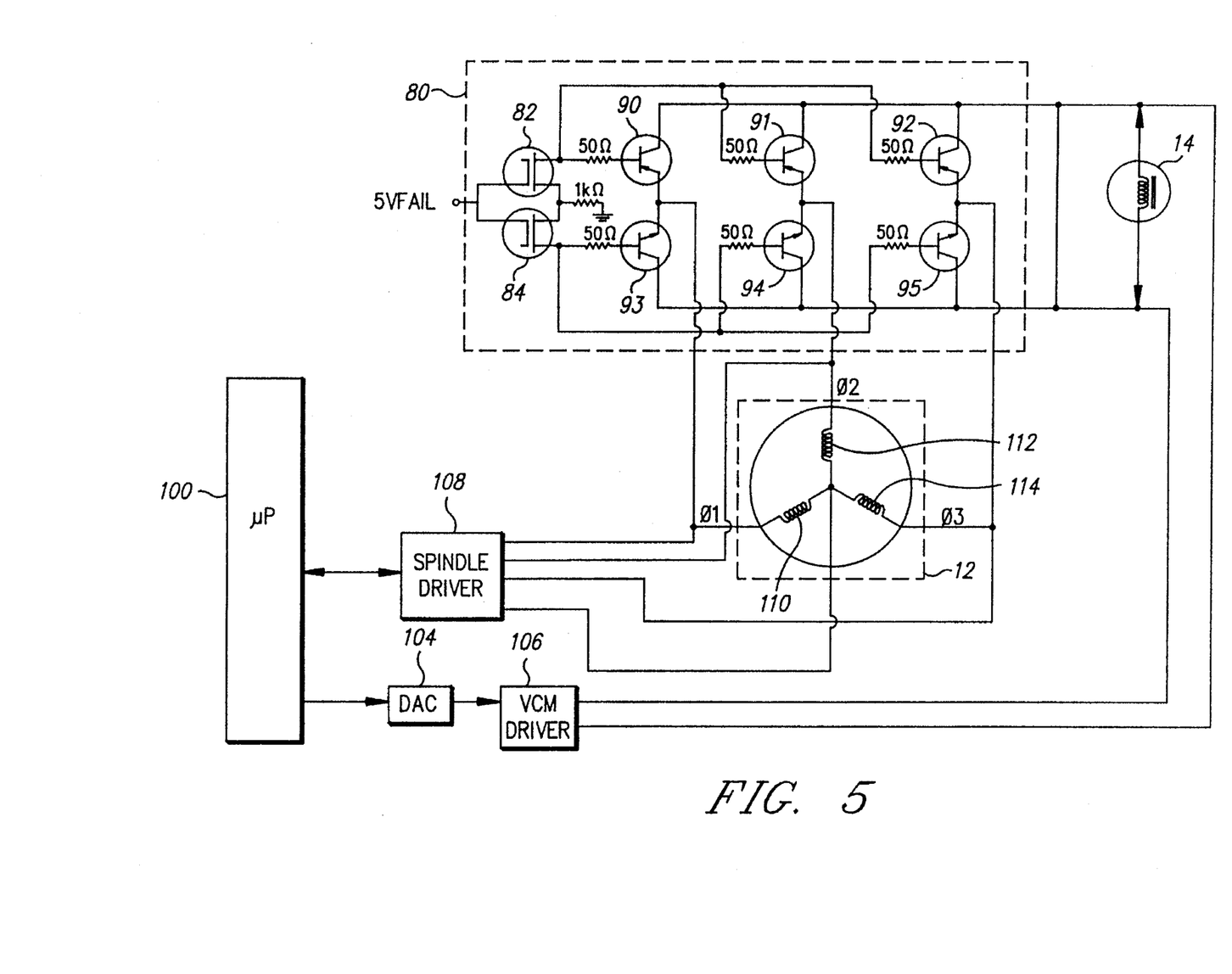
FIG. 5 is a block diagram of a disk drive showing the rectifier circuit of the present invention.

As shown in FIG. 5, spindle motor 12, spindle motor driver 108, VCM 14, and VCM driver 106 are identical in operation as described. The new rectifier circuit 80 uses a switch that closes when a positive voltage is applied. The switch may be a relay, a single FET, or other suitable switching device. In the preferred embodiment, the switch is a pair of enhancement mode FETs 82, 84 that close when a positive voltage is applied to their "5VFAIL" input. The 5VFAIL signal comes from power-off detection circuitry (not shown). (The power-off detection circuitry is typically powered by a small capacitor that stores charge to operate the detection circuitry after power has been removed. The 5VFAIL input requires virtually no current so only a small capacitor is needed.) Bipolar transistors 90–95 in rectifier circuit 80 are connected between spindle motor windings 110, 112, 114 and VCM 14. The PNP transistors 90, 91, 92 feed current to one side of VCM 14, and their paired NPN transistors 93, 94, 95 feed the other side of VCM 14.

Figure 6:
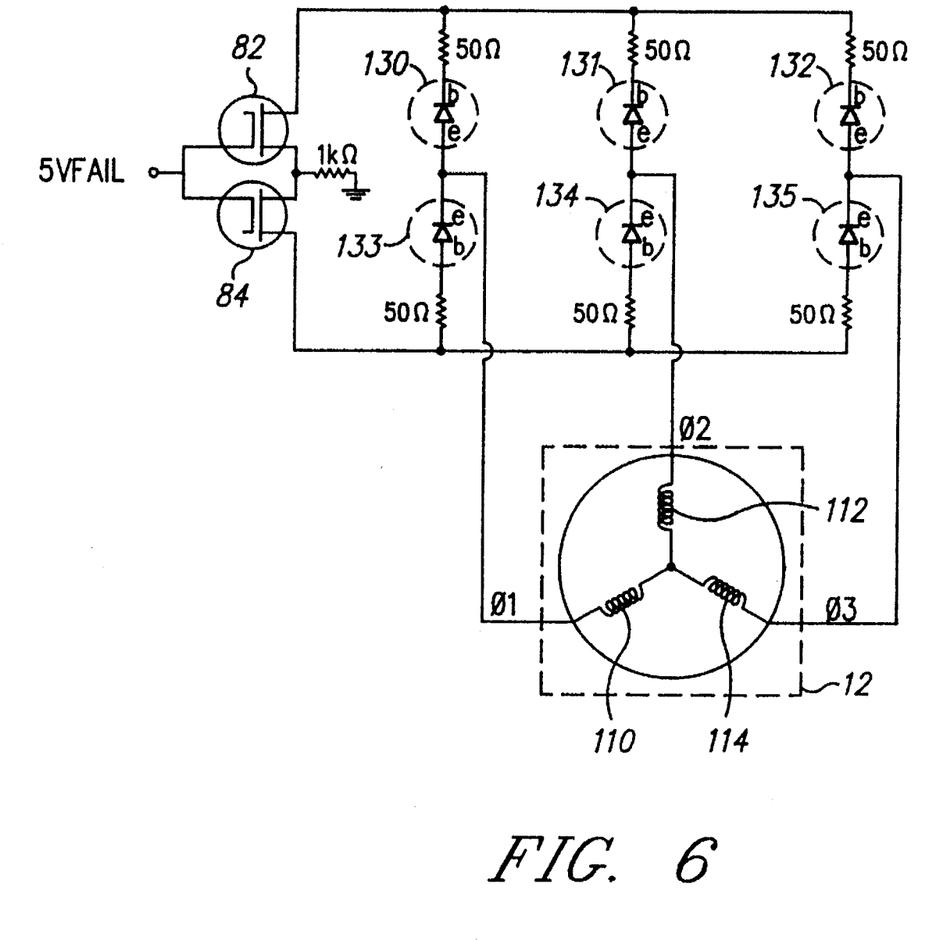
FIG. 6 is a simplified circuit diagram showing the equivalent circuit that synchronously turns on the transistors in the rectifier circuit of FIG. 5.

Referring now to the simplified equivalent circuit diagram of FIG. 6, when the switch (FETs 82, 84) is closed, "diodes" 130–135 represent the emitter-base junctions of bipolar transistors 90–95 and are connected as a three-phase, full-wave rectifier that delivers a relatively small current from the spindle motor 12 through the resistors and the switch. The VCM 14 and the connection to the collectors of transistors 90–95 are not shown in FIG. 6 so that the synchronized switching of the transistors 90–95 can be better explained. The resulting emitter-base "rectifier" circuit is similar to that shown in the prior art circuit 70 (FIG. 3), except that the total current flowing in these emitter-base "diodes" 130–135 is small due to the series resistors (typically 50 ohm), and because the current in this emitter-base circuit does not flow through the VCM 14. This small current is sufficient to turn on the emitter-collector paths in the transistors 90–95 (FIG. 5), which are connected as a three-phase, full-wave rectifier delivering DC current to the VCM 14. Once the FETs 82, 84 are closed at drive power down, a small portion of the output from the windings 110, 112, 114 of the freely rotating spindle motor 12 automatically turns on the appropriate transistors so that the majority of the motor output can be directed to the VCM. This can be understood from FIG. 5 by considering as an example the instant when the current output from winding 110 is more positive than the current output from winding 112 and winding 114 has no output. Then current will flow in series through winding 110, the emitter-base junction of transistor 90, the 50 ohm resistor connected to transistor 90, FETs 82 and 84, the 50 ohm resistor connected to transistor 94, the emitter-base junction of transistor 94, and winding 112. This current turns on only transistors 90 and 94 and allows current from spindle motor 12 to go to VCM 14 through the emitter-collector paths of transistors 90 and 94 that are now in series with VCM 14.

Although each of the emitter-base junctions of transistors 90–95 requires approximately 0.6 volts to turn on, each of the emitter-collector paths of transistors 90–95 has a voltage drop of only 0.15–0.25 volts, if low collector-emitter voltage drop transistors are chosen. Since the emitter-base junctions are connected such that two junctions are always in series across the windings of spindle motor 12, at least 1.2 volts of back EMF is needed from the windings to turn on the respective two transistors. The circuit is thus designed so that the total back EMF is available to turn on the transistors. Of the total back EMF supplied by the spindle motor 12, however, only 0.3–0.5 volts is lost in the emitter-collector junctions that supply current to the VCM. The emitter-base currents are small relative to the emitter-collector currents in the transistors 90–95. The minimum amount of emitter-base current needed to turn on each transistor is determined by the "beta" of the transistor, which results typically in a ratio of emitter-collector/emitter-base current of between 50 and 500. (The 50 ohm resistors have been chosen to supply some excess current to the transistor bases. These resistors should have values optimized for the particular design used.) Thus, only a small fraction of the available current from spindle motor 12 is used in turning on the transistors, with the vast majority of the current flowing through the VCM 14.

When the FETs 82, 84 are open (no positive voltage applied at the 5VFAIL input), all transistors 90–95 are off, and no current flows anywhere in the rectifier circuit 80. Thus, when rectifier circuit 80 is turned off at the 5VFAIL input, it is effectively disconnected from both VCM 14 and spindle motor 12 so no additional switching circuitry is needed. To eliminate the need for any external charge storage to close the FETs 82, 84 at drive power down, the enhancement mode FETs in FIG. 5 may be replaced with depletion mode FETs. With this change, the depletion mode FETs would be turned off (switched open) during normal power-on operation of the disk drive, and would turn on (switched closed) when no voltage is applied to the input. Thus, removing power to the disk drive would automatically enable the rectifier circuit 80 to energize the VCM to move to the parking ramp.

In summary, the present invention offers a simple, low-cost method of providing low voltage drop (high efficiency) rectification of spindle motor back EMF for retracting the actuator to its parked position when power is removed from the disk drive. Such high efficiency is particularly desirable for load/unload drives, which require substantial actuator force to reach the parking ramp.

While the preferred embodiments of the present invention have been illustrated in detail, it should be apparent that modifications and improvements may be made to the invention without departing from the spirit and scope of the invention as described in the following claims.

What is claimed is:

1. A data recording disk drive comprising:
   at least one data disk;
   a multi-phase spindle motor having a winding for each phase and connected to the disk for rotating the disk;
   a transducer for writing data to or reading data from the disk;
   a carrier supporting the transducer;
   a voice coil motor actuator connected to the carrier for moving the carrier generally radially across the disk so the transducer may access different regions of data on the disk; and
   a circuit for converting back electromotive force from the spindle motor to current for the actuator when power to the spindle motor is removed, the circuit comprising a switch responsive to the removal of power to the spindle motor and a plurality of paired bipolar transistors, each pair of transistors being associated with a different one of the windings, each transistor having its emitter-base junction connected in series between its associated winding and the switch and its emitter-collector junction connected in series between its associated winding and the coil of the actuator; whereby in response to closing of the switch the freely rotating spindle motor generates current through successive windings to emitter-base junctions of associated transistors to successively turn on the transistors and thereby direct remaining current from the windings to the coil of the actuator.

2. The disk drive according to claim 1 further comprising a plurality of resistors, each resistor being coupled between the emitter-base junction of a transistor and the switch for minimizing the current flowing from the windings through the emitter-base junctions of the transistors.

3. The disk drive according to claim 1 wherein the switch comprises a field-effect transistor.

4. The disk drive according to claim 3 wherein the field-effect transistor is a depletion mode field-effect transistor held open by the application of power during operation of the disk drive and closed by the removal of power.

5. The disk drive according to claim 1 further comprising means for parking the carrier when the disk is not rotating.

6. The disk drive according to claim 5 wherein the carrier parking means comprises a ramp for supporting the carrier away from the disk surface.

7. A magnetic recording load/unload disk drive comprising:
   a magnetic recording disk for the recording of data;
   a multiple-phase spindle motor having a winding for each phase and connected to the disk for rotating the disk;
   a transducer for writing data to or reading data from the disk;
   a carrier for supporting the transducer;
   a voice coil motor actuator for moving the carrier generally radially across the disk;
   a suspension connecting the carrier to the actuator for maintaining the carrier near the surface of the disk when the disk is rotating;
   a load/unload ramp for parking the carrier away from the disk when the disk is not rotating; and
   a rectifier circuit coupled between the spindle motor and the coil of the actuator for converting back electromotive force from the spindle motor to actuator coil current for driving the carrier to the parking ramp when power to the spindle motor is removed, the circuit comprising a switch responsive to the removal of power to the spindle motor and a pair of bipolar transistors coupled to each winding of the spindle motor, each transistor pair being one PNP transistor and one NPN transistor having their emitters directly connected to the associated winding, their bases connected to the switch and their collectors connected to the coil of the actuator.

8. The disk drive according to claim 7 further comprising a plurality of resistors, each resistor being coupled between the emitter-base junction of a transistor and the switch for minimizing the current flowing from the windings through the emitter-base junctions of the transistors.

9. The disk drive according to claim 7 wherein the switch comprises a field-effect transistor.

10. The disk drive according to claim 9 wherein the field-effect transistor is a depletion mode field-effect transistor held open by the application of power during operation of the disk drive and closed by the removal of power.

* * * * *

UNITED STATES PATENT AND TRADEMARK OFFICE
CERTIFICATE OF CORRECTION

PATENT NO.   : 5,486,957
DATED        : January 23, 1996
INVENTOR(S)  : Thomas R. Albrecht It is certified that error appears in the above-indentified patent and that said Letters Patent is hereby corrected as shown below:

Column 1, line 31, "beating" should read --bearing--.

Column 6, line 31, "dosed" should read --closed--.

Column 8, claim 4, line 4, "dosed" should read --closed--.

Signed and Sealed this

Twenty-third Day of April, 1996

Attest:

BRUCE LEHMAN

*Attesting Officer*   *Commissioner of Patents and Trademarks*